UNITED STATES PATENT OFFICE.

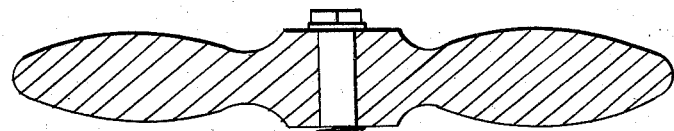
L. A. Dole,
Boring Hubs.
N° 11,364.        Patented July 25, 1854.
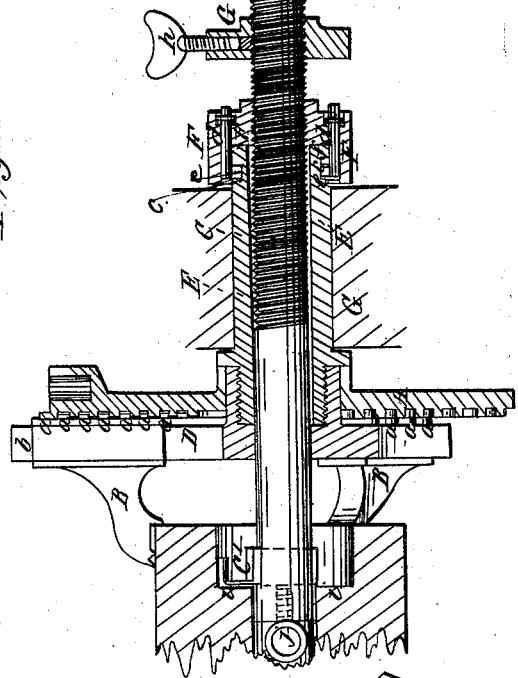
Fig 1.
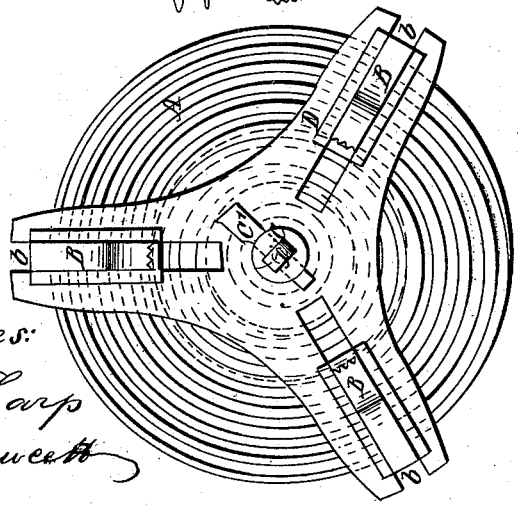
Fig 3.
Fig 2.
Witnesses:
Joel Sharp
John W. Fawcett
Inventor:
L. A. Dole

L. A. DOLE, OF SALEM, OHIO.

ARRANGEMENT FOR LATHE-CHUCKS.

Specification of Letters Patent No. 11,364, dated July 25, 1854.

*To all whom it may concern:*

Be it known that I, L. A. DOLE, of Salem, in the county of Columbiana and State of Ohio, have invented a new and useful Self-Centering Hub-Boring Machine; and I do hereby declare that the following is a full, clear, and exact description of the same, reference being had to the accompanying drawings, forming part of this specification, in which—

Figure 1, is a vertical longitudinal section of one of my boring machines, a section of a hub being shown secured in the same, and partly bored. Fig. 2, is an inverted plan of the same. Fig. 3, is a broken view, showing more plainly the feed nut, and certain catches and stops for preventing said nut turning while the hub is being bored through.

Similar letters of reference in each of the several figures, indicate correspond part.

The first part of my invention relates to the means employed for making the hole which passes through the hub, perfectly true, and the second part relates to the means employed for forming the shoulders in the same after the central bore has been made true.

The nature of said invention consists, 1st, in the employment of a self centering lathe chuck, consisting of a scroll screw and sliding holding jaws, in combination with a mandrel or screw passing through its center, and having a cutter secured on its extremity, for the purpose of boring hubs perfectly true, said screw being fed, while boring, by a female nut attached to the barrel through which the screw or mandrel works.

It consists, 2d, in so constructing and arranging the feed nut, and combining it with a gage plate arranged on the mandrel, that it will be caused to adjust itself at the moment the shoulder of the hub has been cut of the required depth, and then be capable of turning with the screw, and allowing the cutter to square off the shoulder.

To enable others skilled in the art to make and use my invention, I will proceed to describe its construction and operation.

A, represents the centering scroll screw, and B, B, B, the jaws for holding the hub while the boring operation is performed—these parts are constructed, arranged, and operated in a similar manner as when they are employed in connection with a turning lathe. The cogs, $a$, $a$, $a$, on the jaws, B, B, B, working in the scroll screw, as shown in the drawing, and owing to their arrangement, and the peculiar construction of the scroll screw, are operated upon, and each of the jaws caused to move toward the center of the machine, the same distance, and bite upon the hub as represented, and hold it firmly in the center of the machine while the boring is being performed.

C, is the screw or mandrel having the cutting tool, C′, attached to one of its ends, as represented. This screw passes through the center of the plate having the scroll screw cut on it and the center of the plate, D, which has the guide slots, $b$, $b$, $b$, in which the jaws slide, cut in it. This screw also passes through a barrel, E, and works in the feed nut, F, secured on the end of the barrel, E. The barrel, E, is screwed into the scroll screw plate, and is supported by a suitable frame, G. The nut, F, is attached to the barrel, E, by the catches, C, C, on the end of the rods, $d$, $d$, which pass longitudinally through the nut, as represented in the drawing—the catches, $c$, $c$, on these rods play in a groove, $e$, cut in and around the barrel, E.

$f$, $f$, are a series of semi-circular notches cut in and round the front shoulder of said groove—these notches serve for the catches to fit in, when it is desirable not to have the nut turn with the screw, and the groove serves for the catches to play in when it is desirable to have the nut turn with the screw.

G, is a gage plate, fitting over the mandrel or screw; it has a female thread cut in it for the thread of the screw to fit in. $h$, is a set screw for securing this plate after it has been set as desired. This plate serves for gaging the depth that the cutter is to enter the hub in forming the shoulder, $i$, and is caused to operate upon the catches, by the power of the screw, at the moment the cutter has entered the required depth, and throws them out of contact with the notches, $f$, $f$, and consequently, the nut is permitted to turn with the screw, and the cutter caused to square up the shoulder in the most perfect manner.

The tool, C′, is made of the form represented in the drawing, or of any other suitable shape to bore the desired hole through the hub. This cutter is secured by the set screw, $j$, and can be set so as to bore a hole or recess of greater width than the central hole, so as to form a shoulder for the axle box; by loosening said screw and moving the cutting edges of the knife farther from, or nearer to, the center of the mandrel. This can be effected.

The operation is as follows: The hub to be bored and shouldered, is inserted between the jaws, B, and the scroll screw plate is turned to the right, sufficiently to cause the jaws to bite firmly upon the hub. It being thus chucked and centered, the end of the mandrel is inserted into the hole which is generally made through the hub before it is chucked; this being done, and the tool set to bore a hole of the required size, the mandrel or screw is turned by its handle until the cutter reaches or escapes at the opposite end of the hub—the mandrel must now be turned to the left until the cutter can be drawn out of the hole just bored. This operation makes the hole through the hub perfectly true. The cutter must now be adjusted so as to cut a hole of greater diameter, so as to form a shoulder, and the gage plate set so as to have the cutter enter only the desired distance. The two catches of the nut are moved into two of the notches, $f, f$, of the shoulder, $g$, of the groove by pulling against the handle of the screw. All being arranged properly, the mandrel is turned, and the cutter caused to enter as far as desired, when the power of the screw causes the gage plate to act upon the rods of the catches, and force the catches out of the notches, $f, f$, into the groove, $e$, in which they play freely. As soon as this occurs, the nut turns with the screw, the forward motion of the screw stops, and the cutter commences to square up the shoulder, as shown in the drawing. The shoulder being finished, the cutter is withdrawn, and the hub discharged, and another to be bored, is substituted for it.

I am aware that the self-centering lathe chuck is not new, and wish it to be distinctly understood, that I do not claim the same independent of its peculiar arrangement and combination as, and for the purpose herein set forth, but

What I claim as my invention, is—

The manner herein described, of combining and arranging the scroll screw, A; holding jaws, B; screw of mandrel, C; cutter, C′; adjustable nut, F; gage plate, G; sliding catches, $c, d;$ and notched and grooved barrel, E, or their equivalents, for the purpose of constituting a machine which is capable of boring the hub entirely through in a true and perfect manner, and also of being adjusted and set so as to cut a shoulder of the required depth, and to enter the hub the proper distance, and then of being adjusted, as the operation is proceeded with, so as to square up the shoulder in a perfect manner, substantially as herein described.

L. A. DOLE.

Witnesses:
JOEL SHARP,
JOHN W. FAWCETT.